(12) United States Patent
Yasumoto et al.

(10) Patent No.: US 7,264,097 B2
(45) Date of Patent: Sep. 4, 2007

(54) DYNAMIC DAMPER

(75) Inventors: Yoshinori Yasumoto, Kasugai (JP); Tatsuya Suzuki, Kasugai (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 655 days.

(21) Appl. No.: 10/635,689

(22) Filed: Aug. 5, 2003

(65) Prior Publication Data

US 2005/0011713 A1  Jan. 20, 2005

(30) Foreign Application Priority Data

Jul. 17, 2003  (JP) .............................. 2003-198384

(51) Int. Cl.
*F16F 7/10* (2006.01)

(52) U.S. Cl. ...................... 188/379; 267/292

(58) Field of Classification Search ........ 188/378–380; 267/140.12, 292, 293; 74/492, 552; 280/728.2, 280/731

See application file for complete search history.

(56) References Cited

U.S. PATENT DOCUMENTS 5,326,324 A * 7/1994 Hamada ..................... 464/180

FOREIGN PATENT DOCUMENTS

| JP | 02057473 A | * | 2/1990 |
| JP | 02057474 A | * | 2/1990 |
| JP | 02057475 A | * | 2/1990 |
| JP | 4-46246 | * | 4/1992 |
| JP | 06001247 A | * | 1/1994 |
| JP | 08189532 A | * | 7/1996 |
| JP | 2824382 | | 9/1998 |
| JP | 10-267075 | | 10/1998 |
| JP | 3042251 | | 3/2000 |

* cited by examiner

*Primary Examiner*—Xuan Lan Nguyen
(74) *Attorney, Agent, or Firm*—Beyer Weaver LLP (57) ABSTRACT

A dynamic damper including: a mass member; a support frame member having a substantially rectangular support frame portion surrounding the mass member with a given gap distance therebetween and a pair of support sides opposed to each other in a first direction with the mass member disposed therebetween. A plurality of elastic connecting members are disposed in spaces defined between the support sides and opposing end faces of the mass member, respectively, and elastically connect the mass member with respect to the support sides. The support frame portion is deformed so that the pair of support sides are relatively displaced toward each other, to thereby pre-compress the plurality of elastic connecting members. A method of producing such a dynamic damper is also disclosed.

10 Claims, 4 Drawing Sheets

DYNAMIC DAMPER

INCORPORATED BY REFERENCE

The disclosure of Japanese Patent Application No. 2003-198384 filed on Jul. 17, 2003 including the specification, drawings and abstract is incorporated herein by reference in its entirety.

BACKGROUND OF THE INVENTION

1. Field of the Invention

The present invention relates generally to dynamic dampers as one type of vibration damping devices installed on vibrative members in order to attenuate vibration excited in the vibrative members. More specifically, the present invention is concerned with a dynamic damper of novel structure that is capable of exhibiting desired damping effect more precisely and stably than conventional dynamic dampers, and is preferably usable as a dynamic damper for a steering wheel of an automotive vehicle.

2. Description of the Related Art

A steering wheel of an automotive vehicle is a member that is almost always directly handled by an operator during driving of the vehicle, thus the operator of the vehicle is able to sensitively feel minute vibration excited in the steering wheel. Namely, the vibration excited in the steering wheel noticeably affect a riding comfort of the vehicle as felt by the operator, whereby a great importance has been attached on absorbing vibration excited in the steering wheel, in the field of vibration damping for automotive vehicles. Structurally, the steering wheel is attached to a distal end of a longitudinal steering shaft (or steering column) that is fixedly supported at its proximal end, while adding a somewhat mass to the distal end of the steering shaft. For this structural feature, the steering shaft is likely to undergo swinging displacement, thus exhibiting vibration in the steering wheel in some directions orthogonal to an axis of the steering shaft, e.g., vertical and lateral directions of the vehicle. Furthermore, a natural frequency of a steering system including the steering shaft and the steering wheel is usually held within a range of about 20-40 Hz, thereby causing a significant problem of vibration in the steering wheel.

To cope with this problem, it has been proposed to mount a dynamic damper of specific structure on the steering wheel or any other member of the steering system so as to attenuate vibration in a frequency band of idling vibration. Examples of such a dynamic damper are disclosed in Patent Document 1 (JP-A-10-267075) and Patent Document 2 (JP-B-2824382).

The dynamic damper disclosed in Patent Document 1 or 2 includes: a metallic mass member; a metallic support plate fixable to a vibrative member; and an elastic connecting member formed of a rubber elastic body or the like and elastically connecting the mass member and the support plate such that the mass member is effectively and stably displaceable relative to the support plate in a plurality of vibration input directions orthogonal to the axis of the steering shaft, e.g., generally vertical and lateral directions of the vehicle. Therefore, the disclosed vibration damper is able to exhibit damping effect with respect to vibration applied thereto in the plurality of vibration input directions.

As well known in the art, the mass member and the elastic connecting member of the dynamic damper cooperate to provide a mass-spring system functioning as a secondary vibration system with respect to a primary vibration system in the form of the vibrative member. A natural frequency of this secondary vibration system is precisely tuned to a frequency of vibration to be damped in the vibrative member, i.e., in the primary vibration system, whereby the vibration damper can exhibit intended damping effect. Therefore, significant for the dynamic damper are: (i) a highly precise tuning of the natural frequency of the secondary vibration system; and (ii) a long-term stability and sustention in tuning of the natural frequency of the secondary vibration system.

In this regards, the dynamic damper of conventional structure disclosed in the above indicated Patent Document 1 or 2 merely includes a support portion for supporting the mass member via the elastic connecting member, which support portion is formed by simply bending longitudinally opposite side edges of a metallic support plate of thin flat-plate shape. An extensive study by the inventors on the conventional dynamic dampers has revealed that the support portion of above-described structure is insufficient in its strength and rigidity, and is prone to cause variation in shape or dimension from the preset ones at time of manufacture or in the course of practical use. It is not difficult to expect the occurrence of somewhat deformation of the support portion, since a load due to the displacement of the mass member is directly exerted on the support portion via the elastic connecting member. In addition, since the support member is configured to sandwich the mass member in one direction via the elastic connecting member, the change in shape or dimension of the support member directly leads to a change in spring characteristics of the elastic connecting member. As a result, the preset tuning of the dynamic damper is undesirably changed, failing in exhibiting intended damping effect with stability.

The extensive study by the present inventor on the disclosed dynamic damper of conventional structure has also confirmed that when the elastic connecting member is formed of a rubber elastic body, it is effective to pre-compress the rubber elastic body formed by vulcanization of a rubber material, by deforming the support portion after the vulcanization of the rubber material is executed. Namely, it is useful for minimizing a tensile stress in the rubber elastic body due to its contraction during the vulcanization, thus improving durability of the dynamic damper. However, the support portion of the dynamic damper of conventional structure is formed by simply bending the side edges of the support plate of thin-flat-plate shape. If the support portion of the conventional dynamic damper is deformed in order to pre-compress the elastic connecting member, the support portion undergoes a relatively large amount of spring back owing to its structural feature, and it is extremely difficult to control the amount of spring back of the support portion. This makes it further difficult to ensure precision in tuning of the dynamic damper.

SUMMARY OF THE INVENTION

It is therefore a first object of this invention to provide a dynamic damper of novel structure wherein a support frame member, which supports a mass member via an elastic connecting member, can be shaped with high dimensional accuracy and stability, so that the dynamic damper as a second vibration system can be tuned with high precision, and can exhibit desired damping effect in an effective and stable manner. Also the dynamic damper is advantageous in desirably pre-compressing the elastic connecting member, thus ensuring an excellent durability thereof.

It is a second object of the present invention to provide a method of producing a dynamic damper of novel structure as described above.

The above and/or other objects may be attained according to at least one of the following aspects of the invention. The following preferred forms of the respective aspects of the invention may be adopted at any possible optional combinations. It is to be understood that the present invention is not limited to the following forms or combinations of these forms, but may otherwise be recognized based on the thought of the present invention that described in the whole specification and drawings or that may be recognized by those skilled in the art in the light of the disclosure in the whole specification and drawings.

The first object of the invention may be achieved according to a first aspect of the invention, which provides a dynamic damper that comprises: (a) a mass member; (b) a support frame member fixable to a vibrative member, and including a substantially rectangular support frame portion surrounding the mass member with a given gap distance therebetween and having a pair of support sides opposed to each other in a first direction with the mass member disposed therebetween; and (c) a plurality of elastic connecting members disposed in spaces defined between the pair of support sides of the support frame portion and opposing end faces of the mass member, respectively, and elastically connecting the mass member with respect to the pair of support sides of the support frame portion, wherein the support frame portion is deformed so that the pair of support sides are relatively displaced toward each other to pre-compress the plurality of elastic connecting members.

In the dynamic damper constructed according to a first aspect of the invention, by means of the plurality of elastic connecting members, the mass member is elastically connected to and supported by the pair of support sides of the support frame portion, which are disposed on the opposite sides of the mass member in the first direction. In this arrangement, the mass member can be displaced relative to the support frame portion in a second direction in which a center axis of the support frame portion extends, and a third direction orthogonal to both of the first direction in which the pair of support sides are opposed and the second direction mentioned above, where the second and third directions can be aligned to principle elastic axes of the elastic connecting members, respectively. This makes it possible to prevent irregular displacement of the mass member, such as rotation or swing, upon application of vibrational loads to the dynamic damper in the mutually orthogonal second and third directions, thus ensuring stable displacement of the mass member. Therefore, the dynamic damper of the present invention is capable of effectively and stably exhibiting desired damping effect on the basis of displacement of the mass member in both second and third directions.

It should also be appreciated that the elastic connecting members undergo mostly shear deformation when the mass member is displaced in the second and third directions due to vibrational loads applied to the dynamic damper in the same directions (i.e., the direction of the center axis of the support frame member and the direction orthogonal both to the center axis of the support frame member and the first direction in which the pair of support sides are opposed to each other). This arrangement permits a high degree of freedom in tuning of the dynamic damper with respect to vibrational loads applied thereto in the second and third directions, and makes it possible to tune the dynamic damper to a relatively low frequency band, while ensuring an excellent durability of the elastic connecting members. Also, this arrangement allows the dynamic damper to be tuned to the relatively low frequency band without needing a tremendously large mass of the mass member, while keeping the dynamic damper compact in size.

According to the dynamic damper of the present invention, the plurality of the elastic connecting members are pre-compressed by deforming the support frame portion of the support frame member, thus eliminating or minimizing tensile stress in the elastic connecting members, resulting in a further improved durability of the elastic connecting members.

It should further be appreciated that the dynamic damper constructed according to the present invention employs the support frame portion in the form of a substantially rectangular frame, which is closed in its circumferential direction. In comparison with the conventional dynamic damper disclosed in Patent Document No. 2 wherein the metallic mass member is elastically supported by a freely displaceable end portion of the metallic support plate, for example, the present dynamic damper can enjoy extremely improved rigidity and shape or dimensional accuracy in a portion of the support frame member, where the support frame member supports the mass member. For this advantage, after being subjected to the deformation process performed on the support frame portion, the dynamic damper of the present invention can minimize and control an amount of spring back in the support frame portion, with high accuracy. Therefore, the present dynamic damper can improve its durability by pre-compressing the elastic connecting members, can ensure its high dimensional accuracy, and thus can be tuned to a desired frequency band with high stability. Thus, the present aspect of the present invention can provide a dynamic damper of novel structure, which is capable of exhibiting desired damping effect with high stability, while ensuring its excellent durability.

According to one preferred form of the first aspect of the invention, the mass member has a rectangular block-like shape whose profile is somewhat smaller than an inside profile of the support frame portion, and the pair of support sides of the support frame portion and the opposing end faces of the mass member elastically connected to the support sides via the plurality of elastic connecting member are all plane surfaces mutually parallel and extending in a direction orthogonal to the first direction.

This arrangement is advantageous in efficiently obtaining a mass of the mass member within a limited space surrounded by the support frame portion. Besides, each elastic connecting member is bonded at its opposite ends to either of the pair of supporting sides and the corresponding opposing end face of the mass member, where the pair of supporting sides and the opposing end faces of the mass member are all plane surfaces mutually parallel and extending in a direction orthogonal to the first direction in which these plane surfaces are opposed to each other. This arrangement can prevent the elastic connecting members undergoing compression deformation when the mass member is displaced in the both second and third directions, making it possible to further advantageously stabilize the spring constant of the elastic connecting members and resultant damping effect of the dynamic damper.

According to another preferred form of the first aspect of the invention, the plurality of elastic connecting members are bonded to longitudinally intermediate portions of the pair of support sides of the support frame portion, and at least one of the pair of support sides is deformed to be displaced toward the other of the pair of support sides at a longitudinally intermediate portion thereof to pre-compress the plurality of elastic connecting members.

In this preferred form, the longitudinally intermediate portion of at least one of the pair of support sides of the support frame portion is deformed, rather than its end portions which form four edge portions of the support frame portion and are difficult to deform. This makes it yet easy to pre-compress the elastic connecting members due to the deformation of the support frame portion. Since the four edge portions of the support frame portion is prevented from being deformed, the support frame portion can stably preserve its overall strength with the help of the four edge portions.

According to yet another preferred form of the first aspect of the invention, the support frame member includes: a mounting plate having a mounting part fixable to the vibrative member; and a partial frame member having opposite side walls, the partial frame member being superposed on and fixed to one edge portion of the mounting plate at protruding end portions of the side walls and cooperating with the one edge portion to form the support frame portion of overall rectangular shape.

This arrangement facilitate to form the support frame portion of rectangular shape with high efficiently. It should be noted that the support frame portion may have a variety of structure including, but not limited to the illustrated structure. The support frame portion of the rectangular shape may be formed by cutting a tube of rectangular shape in cross section with a suitable width dimension, or alternatively by bending a longitudinal band integrally formed at a mounting portion of the support frame member, and connecting opposite end of the longitudinal band to form a rectangular frame member. In the latter case, the support frame member can be prepared from a single member.

According to still another preferred form of the first aspect of the invention, each of the plurality of elastic connecting members is arranged to exhibit a substantially same spring constant in a second direction in which a center axis of the support frame portion extends and a third direction orthogonal to the first and second directions, and wherein the dynamic damper is adapted to be fixed to a steering shaft with the center axis of the support frame portion being substantially orthogonal to a center axis of the steering shaft.

This preferred form can advantageously provide a dynamic damper capable of exhibiting excellent damping effect with respect to vibration excited in the steering wheel in the second and third directions both orthogonal to the center axis of the steering shaft, due to resonance of a steeling system in a frequency band substantially equal to that of engine idling vibration.

Generally, a dynamic damper for a steering wheel is housed within a extremely narrow space defined by a backside of a cover member adapted to cover a space for accommodating an airbag module, while serving as a hone actuating button. The dynamic damper constructed according to the present invention can be housed within such a narrow spaced with ease. In addition, the support frame portion surrounding the mass member makes it easy to provide a failsafe mechanism for preventing a drop and a complete release of the mass member from the support frame portion. For instance, another member is disposed so as to cover an axially opposite openings of the support frame portion with a given spacing therebetween, whereby such a drop or release of the mass member from the support frame portion can be prevented if the elastic connecting members are subjected to breakage or fracture.

The aforesaid second object of the invention may be achieved according to a second aspect of the present invention, which provide a method of producing a dynamic damper that comprises the steps of: (d) preparing a mass member; (e) preparing a support frame member fixable to a vibrative member and including a substantially rectangular support frame portion having a pair of support sides opposed to each other in a first direction; (f) disposing the support frame member with respect to the mass member such that the support frame portion surrounds the mass member with a given gap distance therebetween, molding a plurality of elastic connecting members to be disposed in spaces defined between the pair of support sides of the support frame portion and opposing end faces of the mass member, respectively, for elastically connecting the mass member with respect to the pair of support sides of the support frame portion; and deforming the support frame portion to displace the pair of support sides toward each other to pre-compress the plurality of elastic connecting members.

According to this method of the invention, the dynamic damper of novel structure according to the first aspect of the invention can be advantageously produced.

According to one preferred form of the second aspect of the invention, the step of deforming the support frame portion includes the step of deforming one of the pair of support sides to be depressed at a longitudinally intermediate portion thereof toward the other one of the pair of support sides to pre-compress the plurality of elastic connecting members.

The method of this preferred form further facilitate to deform the support frame portion to pre-compress the elastic connecting members, making it possible to produce the intended dynamic damper with high efficiency.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENT

Referring first to FIGS. 1-5, shown is a dynamic damper 10 constructed according to one preferred embodiment of the invention. The dynamic damper 10 includes: a support frame member in the form of a metallic support frame member 12; a mass member in the form of a metallic mass member 14; and an elastic connecting member in the form of four rubber connecting pillars 16, 16, 16, 16 by which the mass member 14 is elastically connected to the support frame member 12. Thus, the mass member 14 and the rubber connecting pillars 16 cooperate to constitute a single vibration system.

Figure 1:
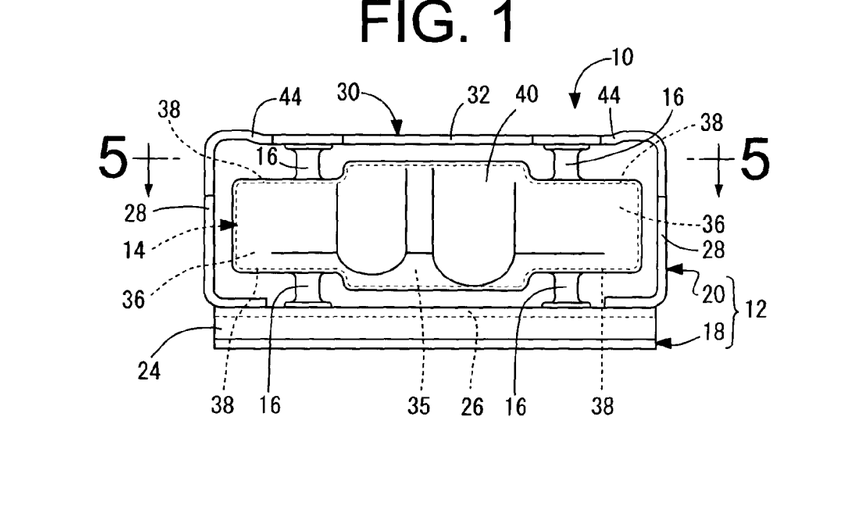
FIG. 1 is a front elevational view of a dynamic damper constructed according to one preferred embodiment of the invention.

More specifically described, the support frame member 12 includes a metallic flat mounting plate 18 and a partial frame member in the form of a metallic gate-shaped frame member 20 welded on the flat mounting plate 18. The flat mounting plate 18 is of rectangular flat-plate shape in its entirety and has a circular window 22 formed through its central portion. The flat mounting plate 18 is further formed with four bolt holes 34, 34, 34, 34 located surrounding the circular window 22 at substantially regular intervals in a circumferential direction of the circular window 22.

A stepped portion 24 is formed on one of longitudinally opposite sides of the flat mounting plate 18, slightly pushing the corresponding edge portion of the flat mounting plate 18 to one of opposite sides of the flat mounting plate 18 (i.e., the front side) for thereby providing a supporting edge portion 26. On the other hand, the gate-shaped frame member 20 is formed by bending a thin rectangular flat plate metal into a gate shape overall. Thus, the gate-shaped frame member 20 includes a tope wall 32 and a pair of sidewalls 28, 28 extending in the same direction from the longitudinally opposite ends of the top wall 32. The gate-shaped frame member 20 is situated on the supporting edge portion 26 of the flat mounting plate 18 with bottom end portions of the side-walls 28 thereof welded onto longitudinally opposite end portions of the supporting edge portion 26.

Thus, on the one edge portion of the flat mounting plate 18, the supporting edge portion 26 and the gate-shaped frame member 20 cooperate to provide a support frame portion 30 having an approximately rectangular shape in its entirety. In this support frame portion 30, a pair of short-side portions mutually opposed are constituted by the both side walls 28, 28 of the gate-shaped frame member 20, and a pair of long-side portions mutually opposed are constituted by the supporting edge portion 26 and the top wall 32 of the gate shaped frame member 20, and serve as a pair of support sides of a support frame portion. That is, the support frame portion 30 is formed on one of opposite measure surfaces of the flat mounting plate 18 in its upright attitude with its center axis extending in a second direction approximately equal to a direction orthogonal to a sheet of FIG. 1, and orthogonal to a first direction in which the long-side portions of the support frame portion are opposed to each other.

In the thus formed support frame member 12, the mass member 14 is disposed within a hollow space surrounded by the support frame portion 30. As is apparent from the front view of FIG. 1 where the mass member 14 and the support frame portion 30 are viewed in the second direction approximately equal to the direction of a center axis of the support frame portion 30 (i.e., a direction orthogonal to a sheet of FIG. 1), the mass member 14 has a substantially rectangular configuration that is somewhat smaller than the hollow space surrounded by the support frame portion 30. The mass member 14 is situated in a substantially central portion of the hollow space surrounded by the support frame portion 30 so that the mass member 14 is spaced away from the support frame portion 30 with a gap therebetween over its entire circumference.

As is also apparent from the front elevational view of FIG. 1, the height dimension of the mass member 14 (as measured in the vertical direction of FIG. 1) is made smaller at its both longitudinally opposite end portions 36, 36, rather than at its longitudinally central portion 35. In each of the longitudinally opposite end portions 36 where the height of the mass member 14 is made small, vertically opposite end faces 38, 38 as seen in FIG. 1 are opposed to the pair of long-side portions of the support frame portion 30, i.e., the supporting edge portion 26 and the top wall 32, respectively, and are shaped as plane surfaces extending in a direction orthogonal to the vertical direction or the first direction where the long-side portions of the support frame portion 30 are opposed to each other. In other words, the vertically opposite end faces 38, 38 in each of the longitudinally opposite end portions 36 extend parallel to the respective long-side portions of the support frame portion 30, i.e., the supporting edge portion 26 and the top wall 32 to which these end faces 38, 38 are opposed with given vertical distances therebetween.

As measured in the second direction of the center axis of the support frame portion 30 (i.e., the direction orthogonal to the sheet of FIG. 1), the thickness of the mass member 14 is somewhat larger than that of the support frame portion 30, so that the mass member 14 protrudes outward from the support frame portion 30 in both sides in the direction of the center axis of the support frame portion 30. The specific shape of the mass member 14 is not limited to the present embodiment, but may be suitably determined giving consideration to elimination of interface between the mass member 14 and the members disposed around the mass member 14, and a mass of the mass member 14 required to achieve desired damping effect, and the like.

The mass member 14 and the support frame portion 30 surrounding the mass member 14 are elastically connected together by means of the four rubber connecting pillars 16 in total. The four rubber connecting pillars 16 are disposed in four spaces defined between the longitudinally opposite end portions 36, 36 of the mass member 14 and the pair of long-side portions of the support frame portion 30, i.e., the supporting edge portion 26 and the top wall 32 each being opposed to the longitudinally opposite end portions 36, 36. In the present embodiment, particularly, each rubber connecting pillar 16 is arranged with its center axis extending generally in the first direction, i.e., the direction in which the pair of long-side portions, i.e., the supporting edge portion 26 and the top wall 32 are opposed to each other. Thus, each rubber connecting pillar 16 is bonded at its axially opposite end faces to either of the pair of long-side portions of the support frame portion 30 and the corresponding end faces 38, 38 of the longitudinally opposite end portions 36, 36 of the mass member 14, in the process of vulcanization of a rubber material for forming the rubber connecting pillars 16.

According to the present embodiment, a thin coating rubber layer 40 is secured to the surface of the mass member 14 to substantially entirely coat the mass member 14, and the coating rubber layer 40 and the rubber connecting pillars 16 are formed integrally. That is, the coating rubber layer 40 and the rubber connecting pillars 16 may be formed by vulcanizing a rubber material injected into and filling a mold cavity of a predetermined mold wherein the support frame member 12 and the metallic mass 14 are preset in position. These coating rubber layer 40 and the rubber connecting pillars 16 are bonded to the metallic support frame member 12 and the mass member 14 at the time when the rubber material is vulcanized in the cavity.

Further, these rubber connecting pillars 16 disposed respective spaces defined between vertically opposing plane surfaces of the longitudinally opposite end portions 36, 36 and the pair of long-side portions of the support frame portion 30 (the supporting edge portion 26 and the top wall 32), extend parallel to one another in the first or vertical direction as seen in FIG. 1, with a constant generally rectangular shape in vertical cross section. As discussed above, the height dimension of the mass member 14 is made small at the longitudinally opposite end portions 36, 36, rather than at the longitudinally central portion 35 in the present embodiment, making it possible to obtain a relatively large free length of the rubber connecting pillars 16. In this regards, the longitudinally central portion 35 of the mass member 14 projects toward and opposed to the pair of long-side portions of the support frame portion 30 with a given spacing therebetween in a static state as shown in FIG. 1. When excessively displaced relative to the support frame portion 30, the metallic mass 14 is brought into elastic contact with the pair of long-side portions, i.e., the supporting edge portion 26 and the top wall 32, via the coating rubber layer 40, thereby providing a stopper mechanism for limiting an amount of displacement of the metallic mass member 14 relative to the support frame portion 30 in the vertical direction as seen in FIG. 1.

Figure 2:
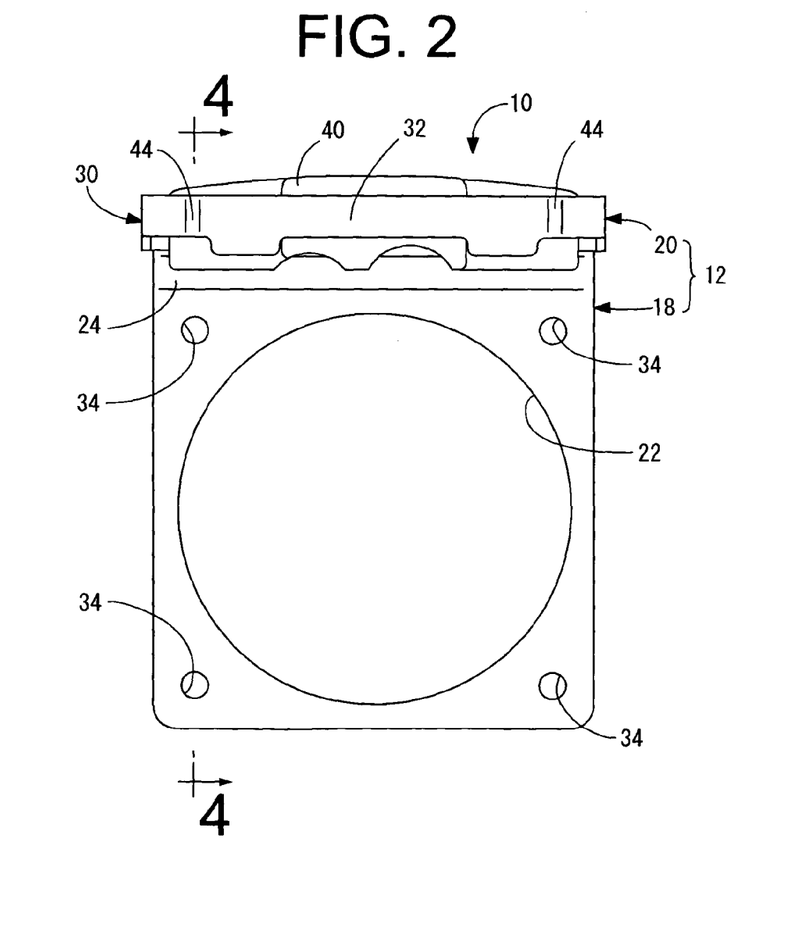
FIG. 2 is a top plane view of the dynamic damper of FIG. 1.
Figure 3:
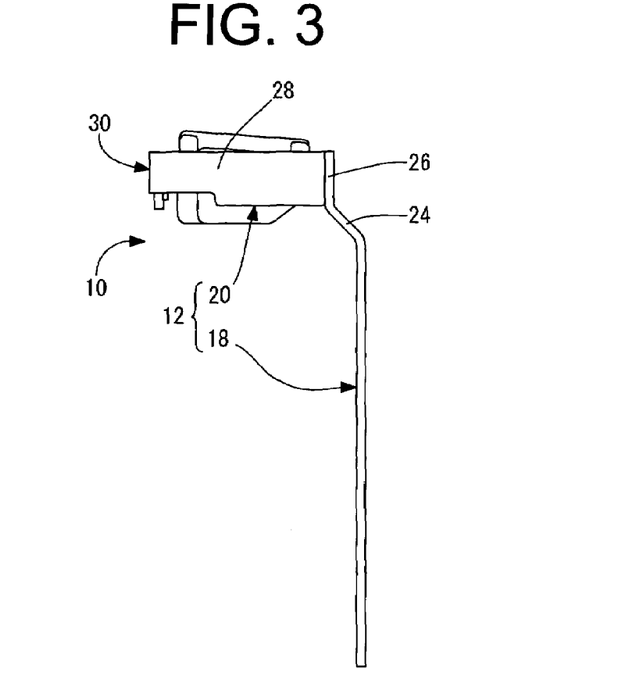
FIG. 3 is a right-side elevational view of the dynamic damper of FIG. 2.
Figure 4:
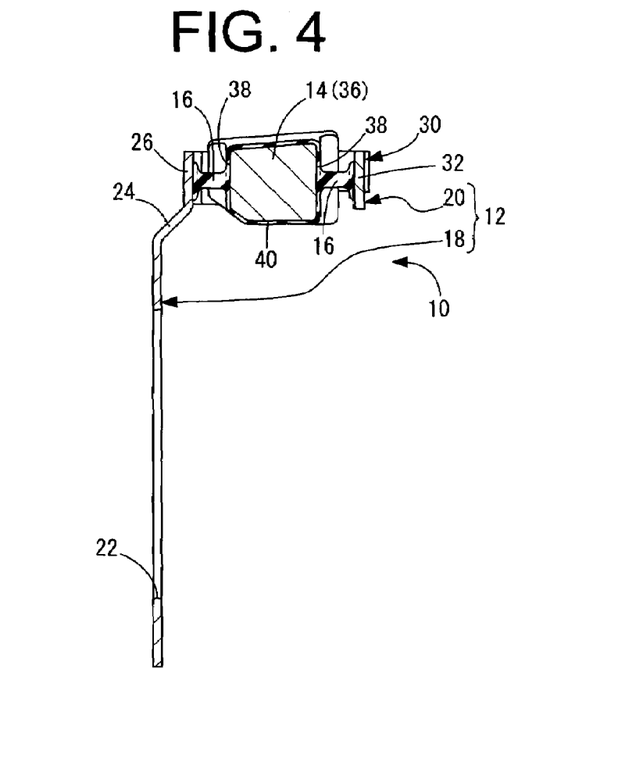
FIG. 4 is a cross sectional view taken along line 4-4 of FIG. 2.
Figure 5:
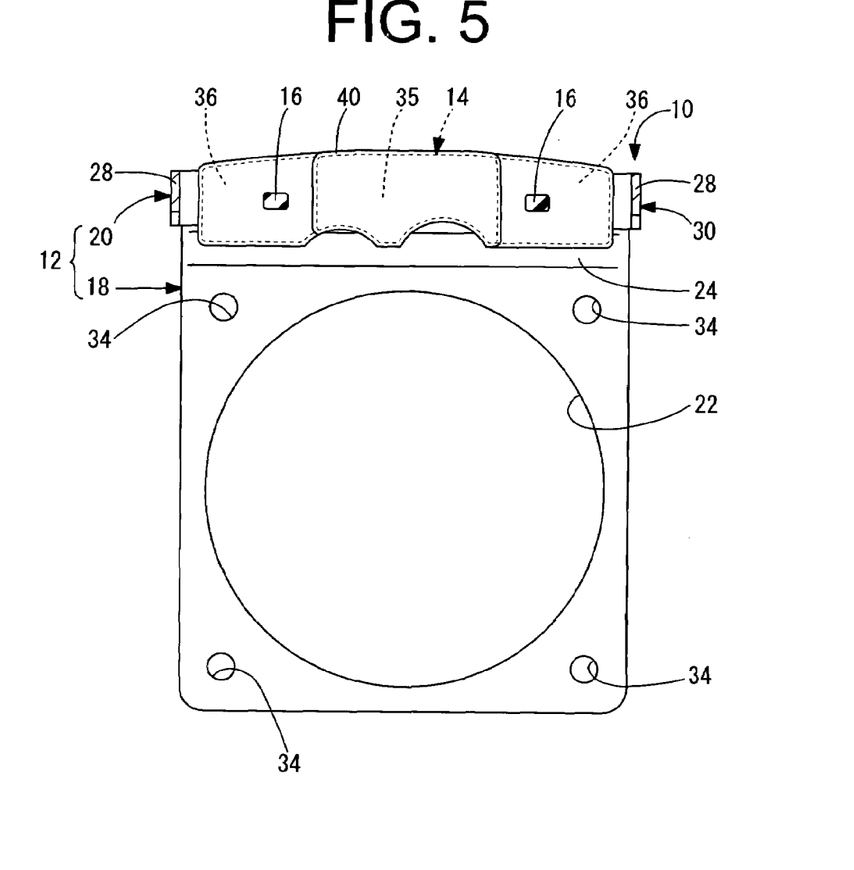
FIG. 5 is a cross sectional view taken along line 5-5 of FIG. 1.

Since each rubber connecting pillar 16 has the constant rectangular shape in vertical cross section, the dynamic damper 10 can be tuned differently in the vertical and lateral directions as seen in FIG. 2, in other words, in the second and a third direction that is orthogonal to both of the first and second directions. Described in detail, the lateral direction as seen in FIG. 2 is substantially aligned with a direction in which long sides of the rubber connecting pillar 16 in the vertical cross section extend. As a result, the tuning frequency of the dynamic damper 10 is made higher in the lateral direction rather than in the vertical direction.

These four rubber connecting pillars 16 cooperate together to elastically connect and support the mass member 14 to and on the support frame portion 30, thereby providing a single vibration system adapted to function as a secondary vibration system with respect to a primary vibration system in the form of a steering system, which will be described later.

In the provided vibration system in the form of the dynamic damper 10, principal elastic axes of a spring component of the dynamic damper 10 are respectively substantially aligned with a mass axial center line passing through a center of gravity of the mass member 14 and extending parallel to the center axis of the support frame portion 30 (i.e., the second direction), and mass vertical and lateral center lines orthogonal to the mass axial center line and extending in the vertical and lateral directions as seen in FIG. 1 (i.e., the first and third direction) through the center of the mass member 14. This arrangement makes it possible to eliminate or minimize rotations or other irregular displacement of the mass member 14, when the mass member 14 is displaced relative to the support frame portion 30 in the first and third or vertical and lateral directions as seen in FIG. 1 as well as the second or center axis direction of the support frame portion 30, due to external force applied to the vibration system, i.e., the dynamic damper 10. Thus, the dynamic damper 10 of the present invention ensures a stable displacement of the mass member 14 relative to the support frame portion 30.

Additionally, the top wall 32 of the gate shaped frame member 20, which forms one of the pair of long-side portions of the support frame portion 30, is subjected to a deformation process so that a longitudinally intermediate portion of the top wall 32 is pressed downward to be situated somewhat close to the other long-side portion constituted by the supporting edge portion 26 of the flat mounting plate 18.

Figure 6:
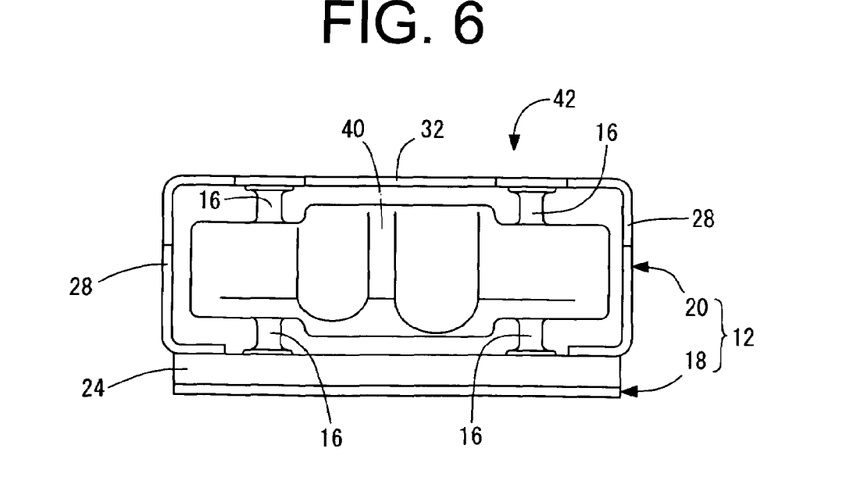
FIG. 6 is a front elevational view of an integral vulcanized product of the dynamic damper of FIG. 1.

Referring to FIG. 6, the pair of long-side portions of the support frame portion 30, i.e., the supporting edge portion 26 and the top wall 32 have still rectangular flat plate shape, both extending straightly and parallel to each other over their entire areas including longitudinally opposite edge portions thereof, when the support frame member 12 is formed by assembling the flat mounting plate 18 and the gate-shaped frame member 20 together by welding, or when an integral vulcanized product 42 is provided by molding the coating rubber layer 30 and the rubber connecting pillars 16 in the mold with the support frame member 12 and the mass member preset, as shown in FIG. 6.

As is understood from FIG. 1, the integral vulcanized product 42 illustrated in FIG. 6 is then subjected to the deformation process in which the upper long-side portion, i.e., the top wall 32 of the gate-shaped frame member 20 is deformed by pressing such that a pair of shoulder portions 44, 44 are respectively formed in the vicinity of the longitudinally opposite end portions thereof, and that the upper long-side portion or the top wall 32 is displaced toward the lower long-side portion or the supporting edge portion 26 over its entire intermediate portion, except bending portions with substantially right angles formed at the longitudinally opposite end portions thereof (i.e., four edge portions of the support frame portion 30. As a result, diminished is a gap distance between opposing surfaces of the mass member 14 and the pair of long-side portions of the support frame portion 30, i.e., the supporting edge portion 26 and the top wall 32 sandwiching the mass member 14. Thus, the rubber connecting pillars 16, which connect the mass member 14 and the long-side portions of the support frame portion 30 in the opposing direction (i.e., the first or vertical direction as seen in FIG. 1), undergo compression deformation in the axial direction thereof, and are pre-compressed in their axial direction.

Figure 7:
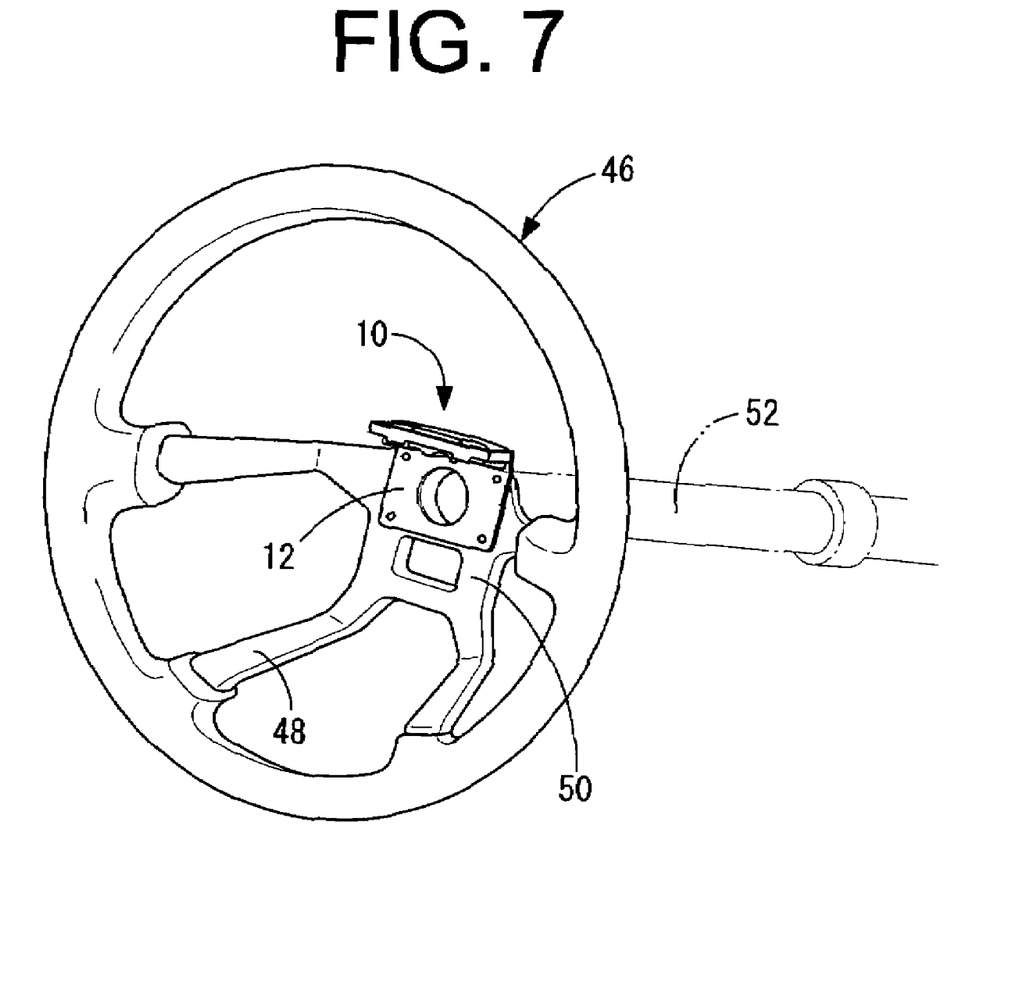
FIG. 7 is an explanative view showing a state where the dynamic damper of FIG. 1 is mounted on a vibrative member.

Referring to FIG. 7, the dynamic damper 10 constructed as described above may be mounted, for example, on a steering wheel 46 such that the flat mounting plate 18 of the support frame member 12 is superposed on a boss portion 50 of a reinforcing member 48 of the steering wheel 46 and fixed to the boss portion 50 by means of a fixing bolt extending through the bolt holes 34 formed through the flat mounting plate 18 of the support frame member 12. This steering wheel 46 is fixed to a proximal end portion of a steering shaft 52. When vibration is excited in a steering column constituted by including the steering shaft 52, the dynamic damper 10 functions as the secondary vibration system, thus exhibiting desired damping effect to eliminate or minimize vibration excited in the steering wheel 46.

In the state where the dynamic damper 10 is mounted as shown in FIG. 7, the center axis of the support frame portion 30 (i.e., the second direction) is approximately orthogonal to a center axis of the steering shaft 52, and the vertical direction as seen in FIG. 1 (i.e., the first direction) is approximately aligned with a direction of the center axis of the steering shaft 52, while the lateral direction as seen in FIG. 1 (i.e., the third direction) is approximately orthogonal to the direction of the center axis of the steering shaft 52. Namely, mutually orthogonal two directions (i.e., the second and third directions) that are both orthogonal to the center axis of the steering shaft 52 are substantially aligned with the vertical and lateral directions of the steering wheel 46 in FIG. 7, and also respectively aligned with the direction of the center axis of the support frame portion 30 (i.e., a direction orthogonal to the sheet of FIG. 1) and the lateral direction of the dynamic damper as seen in FIG. 1. In this arrangement, the mass member 14 of the dynamic damper 10 can be displaced in these mutually orthogonal two directions (i.e., the second and third directions) on the basis of elastic deformation of the rubber connecting pillars 16 that mainly undergo shear deformation, making it easy to diminish a spring constant of the secondary vibration system in the form of the dynamic damper 10. Therefore, the secondary vibration system constituted by the dynamic damper 10 can be tuned in the mutually orthogonal two directions both orthogonal to the center axis of the steering shaft 52 to a frequency band of idling vibration (e.g., 20-40 Hz) in which vibration condition in the steering wheel 46 is prone to be deteriorated.

In the dynamic damper 10, the rubber connecting pillars 16 elastically connect the mass member 14 and the support frame portion 30 substantially in the same direction. In this direction, the long-side portions of the support frame portion 30 (i.e., the supporting edge portion 26 and the top wall 32) to which the rubber connecting pillars 16 are bonded are relatively displaced toward each other for diminishing the dimension of that of the support frame portion 30 after molding the rubber connecting pillars 16 in a vulcanization process. Therefore, tensile stress generated in the rubber connecting pillars 16 in the vulcanization process can be eliminated or minimized, and compression stress can be generated in the rubber connecting pillars 16 as needed, thus advantageously assuring durability of the rubber connecting pillars 16 and the dynamic damper 10 as well.

Additionally, the support frame portion 30 has a closed frame structure in its entirety, allowing the support frame portion 30 to exhibit a sufficiently large rigidity with compact size, without needing a extremely large thickness thereof. This structural feature of the support frame portion 30 permits a high dimensional accuracy in a manufacture of the support frame member 12, and in the successive deformation process performed on the top wall 32 of the gate shaped frame member 20. Particularly, the support frame portion 30 of closed frame structure is able to reduce and control an amount of spring back after the top wall 32 is deformed.

That is, the support frame portion 30 of closed frame structure makes it possible to set with high precision the gap distance between the pair of long-side portions thereof (the supporting edge portion 26 and the top wall 32) to which the rubber connecting pillars 16 are secured, so that the spring constant of the rubber connecting pillars 16 and the natural frequency of the secondary vibration system constituted by the dynamic damper 10 can be tuned to respective desired values with high precision. In the case where an extremely large external force is exerted on the dynamic damper 10 installed on an automotive vehicle, the sufficiently large rigidity of the support frame portion 30 can prevent undesirable deformation of the support frame portion 30, thereby effectively avoiding a resultant change in tuning of the secondary vibration system.

Therefore, the dynamic damper 10 constructed as described above is capable of exhibiting intended damping capability with high precision and long-term stability. For instance, the dynamic damper 10 is noticeably improved in terms of its capability, reliability and durability, in comparison with the conventional dynamic damper disclosed in the Patent Document 2 mentioned above.

Generally, in a steering system of an automotive vehicle, a center axis of a steering shaft tilts as shown in FIG. 7, thus exciting vibration in a steering wheel not only in the vertical direction but in the axial and lateral directions of the steering wheel. Resonance of the steering wheel in the axial direction is generally coupled with that in the vertical direction, but is distinct from that in the lateral direction. In this regards, the dynamic damper 10 of the present embodiment employs the rubber connecting pillars 16 having the generally rectangular shape in vertical cross section, making it possible to differently tune the dynamic damper 10 in the vertical and lateral directions (i.e., the second and third directions).

A specimen of the dynamic damper 10 was actually prepared and tuned to a desired frequency that is equal to a frequency of idling vibration excited in a steering wheel, which was measured in advance in an actual automotive vehicle. The prepared specimen of the dynamic damper 10 was measured in terms of its damping characteristics, and the obtained measurement has revealed the fact that the specimen of the dynamic damper 10 can exhibit damping characteristics whose values are extremely close to the desired ones. Further, the specimen of the dynamic damper 10 was actually mounted on a steeling wheel of an automotive vehicle, and vibration speed in the steeling wheel during engine idling of the vehicle was actually measured. This measurement has revealed that the dynamic damper 10 can cut the maximum speed of vibration in the steering wheel to the value of about 2 mm/s, while the steering wheel without the dynamic damper 10 suffers from vibration having the maximum speed of about 6 mm/s. This confirms that the specimen of the dynamic damper 10 of the present embodiment is highly precisely provided with desired capability needed for exhibiting an intended damping effect obtained through design theoretical values, in a considerably effective manner.

While the presently preferred embodiment of this invention has been described in detail for illustrative purpose only, it is to be understood that the present invention is not limited to the details of the illustrated embodiment, but may be otherwise embodied with various other changes, modifications and improvements, which may occur to those skilled in the art, without departing from the spirit and scope of the invention defined in the following claims.

For instance, a structure for mounting the support frame member 12 on the steering shaft 52, dimensions of the support frame portion 30 and the mass member 14, and the shape and dimension of the rubber connecting pillars 16 may be suitably determined taking into account a shape and a size of the space for installing the dynamic damper, required damping effect, and the like.

For stabilizing displacement of the mass member 14 in the mutually orthogonal directions, it is desirable that four or more rubber connecting pillars 16 are arranged in the hollow space surrounded by the support frame portion 30 such that the equal number of rubber connecting pillars 56 are disposed on both longitudinally opposite sides of the mass member 12, like in the present embodiment. It is also possible for practicing the present invention to employ two rubber connecting pillars 56 that are located longitudinally central portion of the hollow space surrounded by the support frame portion 30, while being disposed on vertically opposite faces of the mass member 14, respectively.

While the illustrated embodiment of the invention takes the form of a dynamic damper for a steering wheel, it is to be understood that the principle of the invention is applicable to other types of dynamic dampers for use in various members or devices in automotive vehicles, or in various devices other than automotive vehicles.

As is understood from the aforesaid description, according to the dynamic damper constructed of the present invention, or according to the method of producing the dynamic damper of the present invention, the elastic connecting member as a spring component of the secondary vibration system is pre-compressed, thus exhibiting an excellent durability. While the elastic connecting member are pre-compressed by deforming the support frame portion 30 to which the elastic connecting members are bonded, this support frame portion 30 is of specific structure having an approximately rectangular frame-like configuration, making it possible to exactly pre-compress the elastic connecting member with no or few variation, and maintain the elastic connecting member in this pre-compressed state with high precision and a long-term stability. Therefore, the present invention enables to effectively provide a dynamic damper capable of exhibiting intended damping capability with high precision and a long-term stability.

What is claimed is:

1. A dynamic damper, comprising:
   a rectangular mass member;
   a support frame member fixable to a vibrative member, and including a substantially rectangular support frame portion surrounding said mass member with a given gap distance therebetween and having first and second support sides opposed to each other in a first direction with said mass member disposed therebetween so that the first support side of the support frame member is opposed in the first direction to a first supported side of the mass member, and the second support side of the support frame member is opposed in the first direction to a second supported side of the mass member, said support frame member being closed in a circumferential direction thereof, while being open in an axial direction perpendicular to the first direction;
   at least one longitudinal elastic connecting members being disposed in a spaces defined between the first support sides of said support frame portion and the first supported side of said mass member, and being bonded by vulcanization at opposite ends thereof to the first support side and the first supported side; and
   at least another longitudinal elastic connecting member being disposed in a space defined between the second support side of said support frame portion and the second supported side of the mass member, and being bonded by vulcanization at opposite ends thereof to the second support side and the second supported side,
   wherein said support frame portion is deformed so that said first and second support sides are relatively displaced toward each other to pre-compress said elastic connecting members previously bonded by vulcanization at opposite ends thereof to the support frame portion and the mass member.

2. A dynamic damper according to claim 1, wherein said mass member has a rectangular block-like shape whose profile is somewhat smaller than an inside profile of said support frame portion, and said first and second support sides of said support frame portion and said first and second supported sides of said mass member elastically connected to said support sides via said elastic connecting member are all plane surfaces mutually parallel and extending in a direction orthogonal to said first direction.

3. A dynamic damper according to claim 2, wherein said mass member includes a longitudinally central portion and longitudinally opposite end portions whose dimension as measured in said first direction is smaller than that of said longitudinally central portion, and said elastic connecting members are bonded to said first and second supported sides of said mass member at said longitudinally opposite end portions of said mass member, while said longitudinally central portion of said mass member is adapted to come into contact with said first and second support sides of said support frame portion so as to limit an amount of displacement of said mass member in said first direction.

4. A dynamic damper according to claim 1, wherein said elastic connecting members are bonded to longitudinally intermediate portions of said first and second support sides of said support frame portion, and at least one of said first and second support sides is deformed to be displaced toward an other of said first and second support sides at an longitudinally intermediate portion thereof to pre-compress said elastic connecting members.

5. A dynamic damper according to claim 1, wherein said support frame member includes: a mounting plate having a mounting part fixable to the vibrative member; and a partial frame member having opposite side walls, said partial frame member being superposed on and fixed to one edge portion of said mounting plate at protruding end portions of said side walls and cooperating with said one edge portion to form said support frame portion of overall rectangular shape.

6. A dynamic damper according to claim 1, wherein each of said elastic connecting members is arranged to exhibit a substantially same spring constant in a second direction in which a center axis of said support frame portion extends and a third direction orthogonal to said first and second directions, and wherein said dynamic damper is adapted to be fixed to a steering shaft with said center axis of said support frame portion being substantially orthogonal to a center axis of said steering shaft.

7. A dynamic damper according to claim 1, wherein each of said elastic connecting members is disposed with a center axis thereof extending substantially in said first direction so as to undergo mostly shear deformation as a result of displacement of said mass member in a second direction in which a center axis of said support frame portion extends and a third direction orthogonal to said first and second directions.

8. A dynamic damper according to claim 7, wherein each of said elastic connecting members has an approximately rectangular shape in axial cross section so that said dynamic damper is tuned differently in said second and third directions.

9. A method of producing a dynamic damper comprising the steps of:
   preparing a rectangular mass member;
   preparing a support frame member fixable to a vibrative member and including a substantially rectangular support frame portion having first and second support sides opposed to each other in a first direction so that the first support side of the support frame member is opposed in the first direction to a first supported side of the mass member, and the second support side of the support frame member is opposed in the first direction to a second supported side of the mass member, said support frame member being closed in a circumferential direction thereof, while being open in an axial direction perpendicular to the first direction;
   disposing said support frame member with respect to said mass member such that said support frame portion surrounds said mass member with a given gap distance therebetween,
   molding in a vulcanization process at least one longitudinal elastic connecting member being disposed in a space defined between the first support side of said support frame portion and the first supported side of said mass member, and being bonded at opposite ends thereof to the first support side and the first supported side, and at least one another longitudinal elastic connecting member being disposed in a space defined between the second support side of said support frame portion and the second supported side of the mass member, and being bonded at opposite ends thereof to the second support side and the second supported side; and deforming said support frame portion after said elastic connecting members being bonded by vulcanization to said support frame portion and the mass member so that said first and second support sides are relatively displaced toward each other to pre-compress said elastic connecting members.

10. A method of producing a dynamic damper according to claim 9, wherein said step of deforming said support frame portion includes the step of deforming one of said first and second support sides to be depressed at a longitudinally intermediate portion thereof toward an other one of said first and second support sides to pre-compress said elastic connecting members.

* * * * *